United States Patent [19]
Gardineer et al.

[11] 3,848,515
[45] Nov. 19, 1974

[54] LINEAR HYDRAULIC DRIVE SYSTEM
[75] Inventors: Bayard G. Gardineer, Patterson; Hugo A. Panissidi, Peekskill, both of N.Y.
[73] Assignee: International Business Machines Corporation, Armonk, N.Y.
[22] Filed: Dec. 29, 1972
[21] Appl. No.: 319,403

[52] U.S. Cl.............. 91/184, 91/192, 91/448, 91/449, 92/24
[51] Int. Cl............. F15b 15/26, F01l 21/02
[58] Field of Search ........... 91/176, 183, 189, 191, 91/192, 449, 184, 477

[56] References Cited
UNITED STATES PATENTS

| 324,592 | 8/1885 | Price | 91/184 |
| 2,900,961 | 8/1959 | Sung | 91/151 |
| 3,424,059 | 1/1969 | Conner et al. | 91/176 |
| 3,473,440 | 10/1969 | Firth et al. | 91/176 |
| 3,557,661 | 1/1971 | Orshansky, Jr. | 91/192 |
| 3,583,283 | 6/1971 | Cunningham et al. | 91/35 |
| 3,661,059 | 5/1972 | Hunter | 91/192 |

FOREIGN PATENTS OR APPLICATIONS

| 961,339 | 6/1964 | Great Britain | 91/374 |

Primary Examiner—Paul E. Maslousky
Attorney, Agent, or Firm—Roy R. Schlemmer

[57] ABSTRACT

A linear hydraulic motor is disclosed in combination with an actuator arm wherein the drive is so mounted with respect to the journaling of the arm that manufacturing tolerances may be considerably relaxed while still maintaining extremely accurate and rigid arm positioning. This is accomplished by maintaining full pressure on all arm actuators when the arm is not actually being moved and at the same time mounting said hydraulic motor in a rotational orientation with respect to the bearings supporting said arm. A special aligning rack and piston system is utilized to assure fine positioning of the arm and the system is particularly well adapted for use as a positioning actuator for use with robotized assembly lines and the like.

13 Claims, 4 Drawing Figures

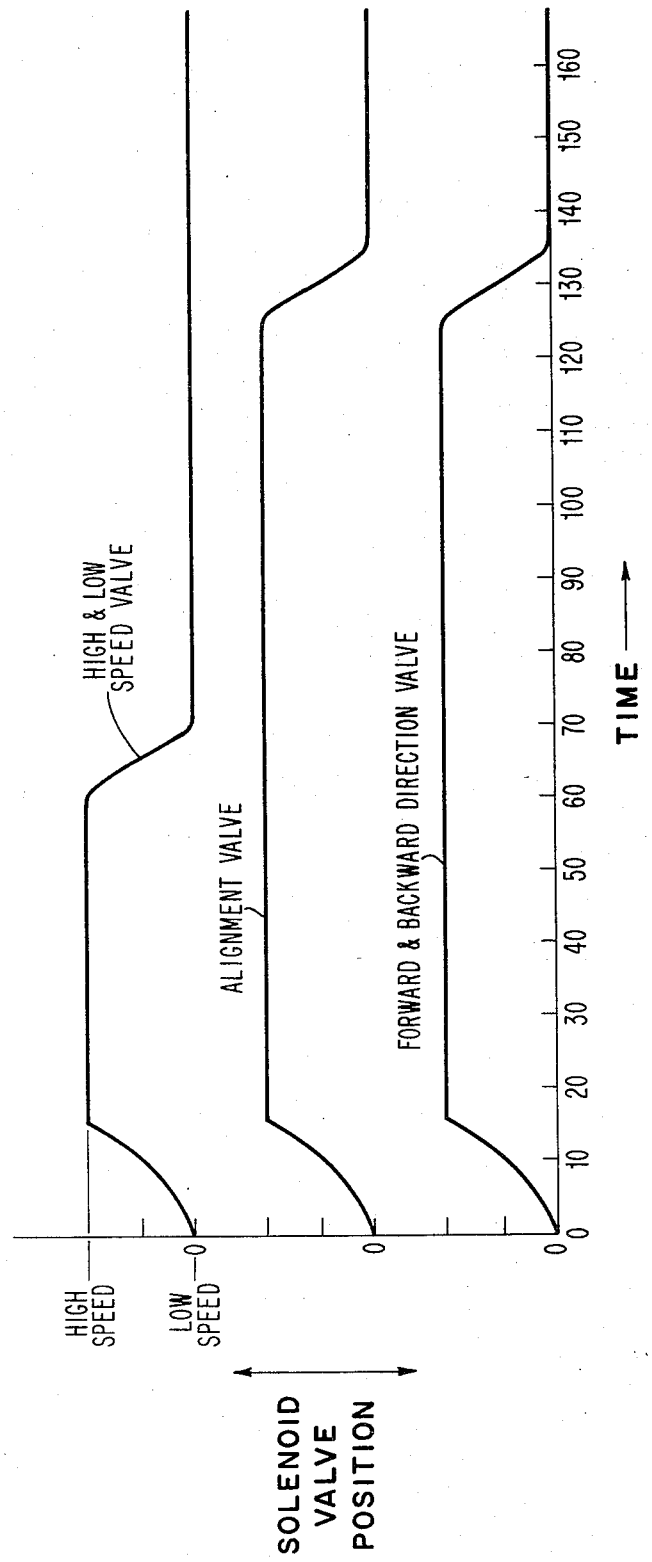

LINEAR HYDRAULIC DRIVE SYSTEM

BACKGROUND OF THE INVENTION

There are many present day applications in industry for the use of hydraulic drive systems, both of the rotary and linear type. Hydraulic motors possess the advantage of being extremely compact for the amount of power they are capable of producing. In particular, linear hydraulic motors have long been widely used in various types of automation machinery such as machine tool control and for performing other more or less automated operations on assembly lines. There are obviously many other uses for hydraulic drive systems. In any application where an electric motor would normally be used a hydraulic drive system of some sort can be adapted to perform the same function. It is, of course, necessary that a source of hydraulic power be provided such, for example, as the availability of a large prime mover which may be readily geared to a hydraulic pump of desired size without seriously affecting the efficiency of the prime mover source.

There have been recent developments in the computer control of various types of operations which require high precision mechanical operations that occur a very large number of times. For example, machine tool control systems where certain operations must occur many thousands of times within a relatively short time, such mechanisms are ideally adapted to automation. In these situations, a computer of some sort is utilized to control a hydraulic system which actually performs the physical or mechanical movements necessary for loading machine tools, controlling the operation of the machine tools, taking parts from storage and placing them on an assembly line belt, etc. In all of these applications the controlled movements must be extremely precise; that is, with limited tolerances in the final location of the moveable portions of the system.

In the past, these accuracy constraints have placed extremely high prices on the necessary hardware for affecting the movements. For example, with linear hydraulic motors, the machined bearing surfaces, bearings themselves and all of the other moveable parts of such hydraulic systems have required extremely precise machining operations. Subsequent to initial production and fabrication these mechanisms have required continuous adjustments to maintain proper operation within required tolerances.

There has been a need in industry for a linear hydraulic motor which provides the usual advantages of a linear hydraulic motor with the additional advantage of being less expensive to produce and very flexible in terms of the operating modes that are available.

SUMMARY AND OBJECTS OF THE INVENTION

It has now been found that it is possible to provide extremely close operating tolerances in a linear hydraulic motor wherein pressure is continuously maintained on the system during all controlled modes of operation whether in a dynamic or rest state. In the rest state pressure is maintained on all of the plurality of actuating pistons and when movement is required the pressure is released on all but the desired piston or pistons which must produce the linear displacement between the motor and the associated linear cam. By suitably mounting the actuating cam on the lever arm rack, a rotational torque is maintained relative to the main motor body carrying the actuating pistons and the rack whereby the two are rotationally locked in a fixed position capable of withstanding very substantial deflecting forces. Further, the structure automatically compensates for wear in any of the bearing surfaces which support the cam carrying linear arm. An additional alignment rack and alignment piston are provided whereby precise alignment of the motor body with respect to the linear rack is obtainable subsequent to all operating cycles of the motor. Automatic provision is further made for selective high and low speed operation of the motor as well as for temporarily allowing "free-wheeling" of the system whereby external forces may readily impart motion to the motor with an absolute minimum of additional control features.

It is accordingly a primary object of the present invention to provide an improved linear hydraulic motor.

It is a further object to provide such a motor having inherent very precise locking features.

It is a further object to provide such a motor wherein manufacturing costs of the overall system are minimized without loss of positioning accuracy of the system.

It is yet another object to provide such a linear motor having special alignment features for very precise positioning of the motor.

It is a still further object to provide such a linear motor readily adaptable to both high and low speed operations.

It is yet another object to provide such a hydraulic motor wherein a substantially constant linear velocity is obtained in the motor.

It is yet another object of the present invention to provide such a linear hydraulic motor including means for free-wheeling of the motor.

It is another object of the invention to provide such a linear hydraulic motor including means for automatically compensating for wear in the bearing surfaces of the moveable portions.

It is another object of the invention to provide such a linear hydraulic motor wherein continuous high pressure is maintained between the piston body and the linear arm carrying the linear cam during all normal operations and wherein the greatest pressure is maintained when the motor is at rest.

The foregoing objects, features and advantages of the invention will be apparent from the following more particular description of a preferred embodiment of the invention as illustrated in the accompanying drawings.

BRIEF DESCRIPTION OF THE DRAWINGS

FIG. 3 is a curve illustrating the operation of the present invention showing the positions of the solenoid actuating valves in a typical timing sequence.

DESCRIPTION OF THE DISCLOSED EMBODIMENT

Figure 1:
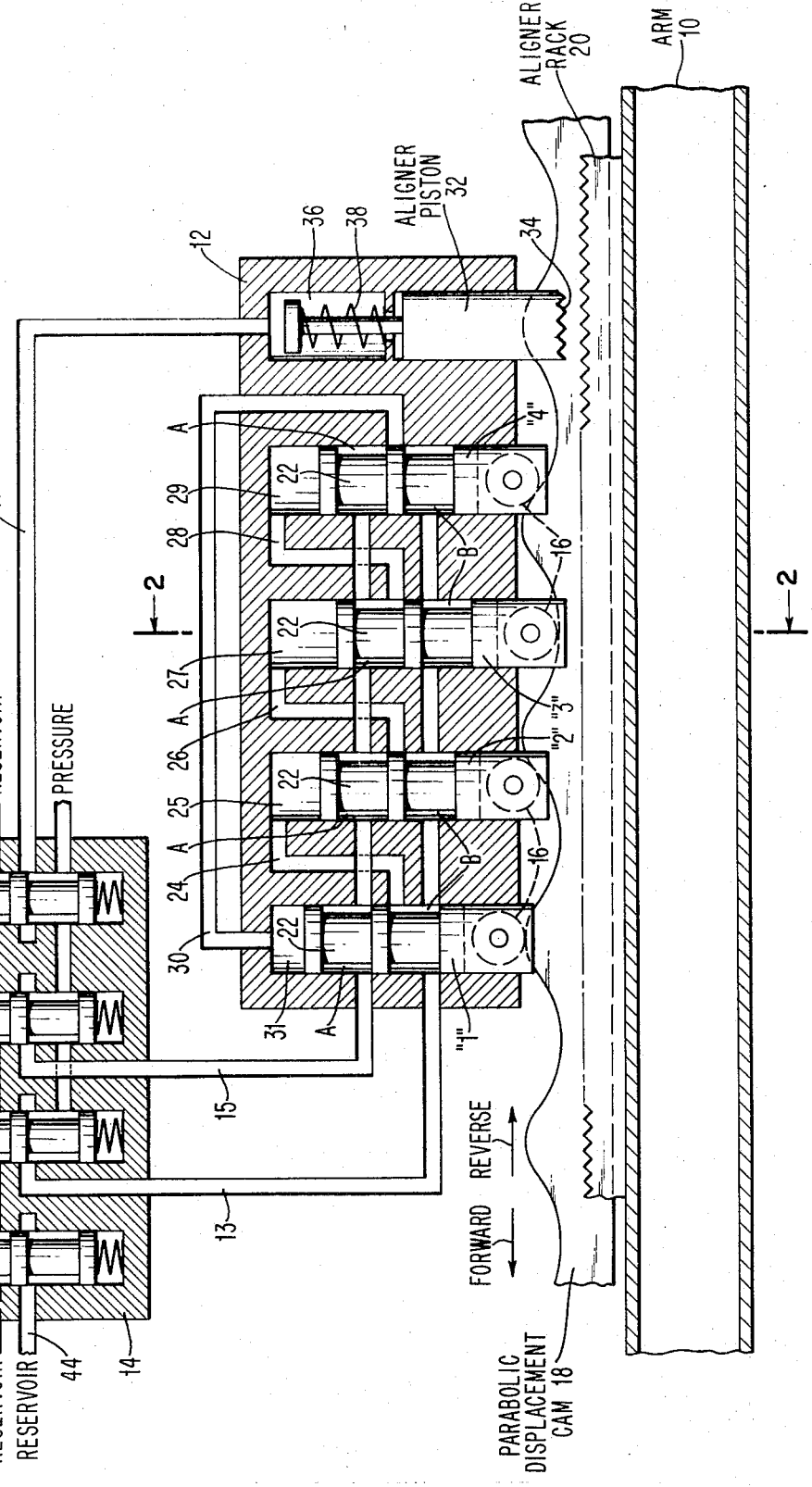
FIG. 1 is a longitudinal cross-sectional view of the linear hydraulic motor of the present invention showing the linear arm and cam rack, the main valve-piston actuator structure, and the solenoid operated control valves.

The objects of the present invention are accomplished in general by a linear hydraulic motor comprising a motor body member and a linear member mounted for linear movement with respect to said body member. At least four drive pistons are provided in said body member linearly displaced along said linear member. Means are additionally provided for imparting relative motion to said linear member when pressure is selectively applied to one of said pistons. The pistons are so disposed with respect to said imparting means that all linear forces along said linear member are canceled out when pressure is applied to all of said pistons. Valve means are provided in said body member associated with each piston member and are directly movable thereby to sequentially actuate one or two other pistons depending upon a selected direction of travel of said linear motor. Each said valve means defines first and second chambers selectively connectable to a pressure source and includes porting means for connecting the activating chamber of said one or two other pistons to one of said chambers depending upon the instantaneous position of said piston. Control means are provided which are operable to connect all of said first chambers to a hydraulic pressure source when it is desired to cause said motor to move in one direction and for connecting all of said second chambers to a hydraulic pressure source when it is desired to cause said motor to move in the other direction. Said control means includes means for connecting both said first and second chambers to said hydraulic pressure source when it is desired to lock the position of said motor.

Said control means includes additional means to release said pressure in both said first and second chambers when it is desired to allow the linear motor to freewheel. A special alignment rack and piston is further provided which is selectively actuated by said control means, engagement of said aligning piston with said rack providing an exact positioning and locking means for said linear motor when it is not being actuated.

The means for imparting the relative motion between the linear member and the motor body is a linear cam rack rigidly mounted on said linear member and engageable by said pistons. Pressure applied by the pistons against the cam surface provides the desired linear motion. In a preferred embodiment of the invention the combination of the piston motion and the cam shape provides a parabolic path which in turn causes substantially linear velocity of said relative motion between the motor body and the linear member.

The construction in said body member associated with each piston comprises a single cylinder, the upper or closed portion of which provides the actuating chamber for moving the piston mounted therein and the valving means comprises a valve body rigidly connected to said piston and directly moveable in response to movement of said piston for selectively connecting said first and second chambers to the actuating chambers of one of the other pistons.

The novel and highly critical aspect of the present invention which allows manufacturing tolerances of the arm and motor assembly to be somewhat relaxed concerns the capability of the motor to be locked in position by applying full hydraulic pressure to all of the actuating pistons whereby a very high rotational force is applied to the linear arm, thus rigidly locking same in the journal or bearing means associated with said motor body. In the disclosed embodiment, this is accomplished by providing bearings at the four corners of the rectangularly shaped linear member at several points and by eccentrically placing the linear cam and actuating pistons at one of the corners whereby a very high rotational force is developed which causes a high torque to be applied to the linear member thus practically eliminating any possibility of mechanical play between the linear member and the bearings. When the surface of the linear member or the bearings experience some wear due to continued use, this torquing action automatically eliminates any further play or looseness from the system. The torquing action of the pistons forces the arm tightly against five of the seven bearings which journal the arm in the motor body support structure as will be more specifically described subsequently with respect to FIG. 2.

It will be readily appreciated in describing the embodiment with particular reference to the accompanying drawings that the linear motion spoken of in the subsequent description relates to the relative motion between the primary motor body containing the cylinders, actuating pistons, valve assembly, etc. and the longitudinal arm on which the linear cam is mounted. It will be apparent that, either the motor body may be fixed and the arm relatively moveable or conversely, the arm may be fixed and the motor body moveable with respect thereto. In the latter instance it will, of course, be appreciated that a moveable harness including both the electrical wires for controlling the solenoid actuated control valves as well as the hydraulic pressure lines would have to be provided on said motor body. However, these techniques are extremely well known in the art.

The present structure and means for controlling it are believed to be unique in that under normal operating conditions the system is constantly pressurized. When at rest both upper and lower piston-valve chambers are provided with high pressure which, as will be apparent from a detailed study of the drawings, causes the activating chambers in each of the cylinders acting on the individual pistons to place maximum pressure on said pistons. Thus, the total rotational or torquing force locking the arm in position in its guide rollers is four times the individual pressure applied to one of the actuating pistons. When it is desired to activate the motor or move same in either direction, this is accomplished not by applying pressure to the selected pistons as in more conventional systems but by removing it from selected pistons, thus allowing those pistons which are not depressurized to impose a force on the linear cam rack and cause the motor to move. Thus, since a maximum total force is placed on the arm when in the rest position, there is a high force maintaining the rotational torque on the linear arm. As will be well appreciated, this holding or locking of the linear arm in position is extremely important in such applications as robotics wherein very precise movements are necessary if adequate selection and control of the ultimate sensors mounted at the ends of the robot arms is to be achieved. While it is not intended to in any way limit the ultimate use of the present linear hydraulic motor system, it should be noted that it was developed for and has particular utility in the field of robotics where extremely precise control is necessary combined with the ever present need for keeping manufacturing costs to a minimum so that greater utilization of the devices in industry is possible.

Having generally described the general features and advantages of the present linear system the invention will now be particularly set forth and described with reference to the accompanying drawings in which the same reference numerals are used to designate the same parts in the various views and diagrams.

Referring first to FIG. 1 a linear cross-sectional view of a linear hydraulic motor embodying the principles of the present invention is shown. The three principle segments of the motor comprise the linear arm portion which is designated by the reference numeral 10. Secondly, the main motor body designated by the reference numeral 12 contains the four primary power pistons and the aligner piston. Finally, the control block 14 contains the two directional valves, the "align" release valve and the high-low speed valve. All four of these control valves are indicated as being solenoid operated. It should be noted at this time that the source of signals for operating various valves would be from some external computer structure (not shown). However, the source of these signals is not considered to be a part of the invention and will not be further described. The various sequences of control functions will be obvious such as the fact that before the directional solenoids or valves are energized, or concurrently therewith, the aligner piston must be removed from engagement with its rack, thus requiring energization of the aligner valve. Similarly, once the motor has reached its desired position, the aligner solenoid is de-energized, thus causing the aligner piston to again engage its rack. Similarly, the high speed solenoid would conventionally be activated allowing high speed motor actuation when a considerable distance is to be moved and at a point approaching final destination of the motor, the high speed solenoid would be de-energized causing the motor to slow down and approach its final position at a slower rate of speed. Thus, the operation of the high-low speed and aligner valves are more or less pre-programmed with respect to operation of the directional valves. It will be noted that the orifices opening into the control valve body marked P and R refer respectively to pressure and reservoir lines as these terms are commonly used in the hydraulics art.

The control valve body 14 may be remotely located with respect to the main motor body 12 in which case three hydraulic lines connecting the directional and align control valves with the motor body would be provided. Alternatively the control valve body could be mounted directly on the main motor body wherein these three pressure lines would probably be internal to the main block. The pressure "P" and return "R" supply lines shown connected to valve body 14 are derived from a constant pressure hydraulic power supply (not shown) by suitable hoses.

It will be noted by referring to the drawing that all four control valves are conventional hydraulic spool valves wherein the three valves designated as Foward, Return and Aligner perform the function of connecting the three designated supply lines 13, 15 and 17, to either the pressure or reservoir supply. In the position shown in the drawings where all solenoids are de-energized, all three lines are connected to the pressure side of the system. This results in depressing the aligner piston to engage its rack and fully pressurizes the drive pistons, as will be explained subsequently.

Referring now to the valve body portion 12 shown in FIG. 1, the four primary actuating pistons labeled "1", "2", "3" and "4" are shown having rotary cam followers 16 rotatably journaled in each of the pistons. These rollers engage the cam rack 18 and as will be well appreciated are utilized to minimize friction and wear in the system. It will be noted that the particular cam rack shown is intended to be a parabolic rack wherein the forces exerted by the piston on the rack follow a parabolic displacement curve which has been found to provide the most linear velocity of the motor. It will be understood that other shaped linear cams such for example as a sine rack could be used. However, in practice this causes considerable velocity ripple which might be objectionable in certain applications. The alignment rack 20 is also clearly shown in the figure as being adjacent to the primary linear cam rack 18. As will be noted in the detail of FIG. 2, the alignment rack 20 comprises two sections, one located on each side of the cam rack and engages suitably shaped teeth in the bottom of the aligner piston. Referring again to the four primary drive pistons, it will be noted that each is slidably mounted in a suitable cylinder having the spool valves 22 attached directly thereto which as will be appreciated would be conventionally machined in a single piece with the actuating piston. The spool valve associated with each of the four drive pistons together with the pistons move axially within their respective cylinders. The upper portion of each of the cylinders together with the top segment of the spool valve provides the actuating portion or chamber for the piston and hydraulic pressure applied to the actuating chamber will tend to force the associated piston downward to exert a force on the linear cam provided other conditions are present as will be explained subsequently.

The spool valves 22 form a series of upper chambers A in each of the cylinders which are directly connected to the Return supply line 15 from the Return control valve. Similarly, spool valves 22 form a second set of chambers B in the lower portion of each of the cylinders which chambers are directly connected to the Forward supply line 13 from the Forward control valve. A series of interconnecting pressure ports or lines 24, 26, 28 and 30 selectively connects each of the valve chambers of each cylinder to the actuating chamber of an adjacent cylinder. These ports are so arranged in the cylinders that the spool valves 22 will, in effect, connect the lines or parts to the chambers A or B, depending upon the location of the respective spool valve and piston. This arrangement, as will be apparent from the subsequent operating description renders the valving arrangement self-commutating so that the motor will continue to run in a given direction as long as pressure is applied to one of the two directional lines 13 or 15 and the other line is connected to the reservoir.

It will next be moted in referring to the figure that each of the pistons is, in essence, located on a different cycle of the linear cam 18. However, it will be noted that they are functionally displaced by 90°. Thus, if the period of the cam were sufficiently long, all of the four actuating pistons could conceivably be located on a single cam cycle. It is well known in such linear hydraulic motors that at least three activating pistons must be used to avoid the possibility of the motor stopping on a dead center position of the cam so that there would be no starting torque under certain circumstances. However, where the actuating pistons perform their own commutation of pressure, there must be a minimum of four or any multiple thereof functionally spaced by 90°, regardless of the position of the cam rack with respect to the motor body when pressure is applied to all four piston actuating chambers, the forces will exactly cancel out assuming, of course, that the pistons are all the same size and equal pressures are applied. Thus, in the position of the motor specifically shown in FIG. 1, pistons 1 and 3 are at top and bottom dead center, respectively, and thus would tend to produce no rectilinear motion in the cam rack and it will be noted that the pistons 2 and 4 are on opposite faces of the cam rack and transmit equal rectilinear force which cancels out any tendency for the motor to move. The same balancing of forces will hold regardless of the relative position of the cam rack with respect to the pistons as will be readily appreciated by those skilled in the art.

Before proceeding with a specific description of the commutative action of the present arrangement, the specific operation of the aligner piston will be briefly mentioned. The alignment piston is a relatively simple and straightforward affair and includes the piston 32 having suitable alignment rack engaging teeth 34 located along the lower portion thereof, said piston being mounted in its own cylinder 36 located in the valve body. Pressure line 17 connected to the align control valve either connects the align piston to the pressure or the reservoir side of the hydraulic system depending upon the position of the aligner solenoid. When line 17 is connected to pressure the aligner piston will be forced into contact with the teeth in the rack 20 and similarly when pressure is released, the return spring 38 causes the piston to be raised in the cylinder and thus disengage the teeth in the rack which will then, of course, allow the motor to be actuated.

The sequence of operation of the aligner piston and aligner solenoid relative to the overall operation of the system will be briefly described relative to the displacement curves of the various control valves illustrated in FIG. 3.

Referring now briefly to the function of the high-low speed control valve, it will be noted that this valve, when actuated, connects the upper chambers 40 of the high-low speed and the two directional control valves to either the return line 42 and 44. It will be noted that an orifice 46 is located in the return line 42 which functions to restrict the flow of hydraulic fluid therethrough and causes the motor to run in the low speed mode. When the high-low speed solenoid is actuated forcing its associated spool valve downward in the cylinder the chamber 40 of the high-low speed valve is connected to the return line 44 thus connecting both chambers 40 associated with the Forward and Reverse directional valves to the unrestricted port 44. This bypasses restricted orifice 42 and allows the motor to operate in the high speed mode. It will of course be appreciated that the high-low speed control valve is not necessary to the present system as the two upper chambers 40 of the directional valves could be suitably connected through a fixed orifice or no orifice to the return line as the case may be.

The operation of the motor will now be described for each direction of movement under control of the two directional control valves indicated Forward and Reverse. Assume first that it is desired to actuate the Forward control valve. Applying a signal to this valve causes valve spool to move down in its cylinder to connect the control line 13 directly to the reservoir. This, in effect, causes all of the lower chambers "B" in each of the four cylinders to be similarly connected to the reservoir. As shown in FIG. 1, with the four pistons in their illustrative positions, only the internal line 24 is connected to chamber B of 1 piston which connects actuating chamber 25 to the return reservoir. At this point, piston 2 is free to rise in its cylinder and force fluid out to the reservoir. At this point it will be noted that there is currently pressure on the top of the 4 piston. Since pistons 1 and 3 are in the top and bottom dead center position, they do not provide any drive force. However, piston 4 as shown in half-way down the cam rack and the pressure in its actuating chamber 29 causes it to move down thus forcing the linear member 10 to be moved to the left due to the perpendicular force applied to the cam rack 18. However, as piston 4 moves down and the cam rack moves to the left, high pressure which is still being supplied to the upper chambers A via line 15 is re-introduced into the port 30 thus maintaining pressure in the actuating chamber 31 at the top of the piston 1. At the same time the movement of the cam rack causes piston 2 to move upward and the result is that the internal line 26 is connected to the reservoir via chamber B in the lower portion of the cylinder 2. This pressure release allows piston 3 to also move upward forcing fluid out to line 13. As this process continues piston 1 receives pressure via line 30 and piston 1 now begins also exerting a force on the cam rack 18 continuing the previous direction of motion to the left and as piston 4 reaches bottom dead center, the spool valve associated with piston 3 will connect line 28 with the lower chamber B associated with piston 3. It will thus be seen that this direction of motion of the cam rack will continue under the self-commutating action of the interconnected pressure chambers and ports so that one or two pistons will be exerting a downward pressure on the cam rack while pressure is released on the other two or three pistons allowing the cam rack to push them up in their cylinders with a minimum of resistance. It should be noted that the speed of the motor is largely controlled by the amount of resistance in the hydraulic circuit which tends to inhibit flow of the fluid being expelled from those pistons being forced in the upper direction, i.e., either through the direct return line 44 or through the restricted return line 42 depending upon the position of the high-low speed control valve.

Assuming that the Forward solenoid valve is maintained in activated condition, the motor will continue moving the cam rack 18 and thus the linear member 10 to which it is rigidly attached to the left until such time as the Forward solenoid valve is deactivated returning pressure to line 13. At this time pressure will again be applied to both the chambers A and B in all four cylinders thus forcing all four pistons downward with approximately equal force to lock the cam rack against linear motion to either the right or the left and to also torsionally lock the linear member with respect to the bearing elements which journal the motor body on said linear member.

The movement of the motor in the opposite direction under control of the Reverse solenoid will now be described. It is to be noted that the operation of this phase of the linear motor is substantially identical to that described with respect to the operation of the Forward solenoid. As with the previous description, when the Reverse solenoid is actuated, the associated control valve moves downward to connect the pressure line 15 to the upper chamber 40 of the control valve thus connecting line 15 to the return or reservoir of the hydraulic system while the control line 15 remains pressurized. Thus, all of the upper chambers A associated with the four motor pistons are exposed to reservoir. In the positions shown in the figure, this causes the actuating chamber 29 of piston 4 to be connected via internal port 28 to the chamber A of piston 3 which, as just stated, is in the low pressure condition. In this condition, piston 4 may readily be moved upward by movement of the cam. Again, since pistons 1 and 3 are at top and bottom dead center, respectively, they will have little restraining effect upon the linear motion of the cam rack even though they may be technically in a pressure condition. It will be noted, however, that the actuating chamber 25 of cylinder 2 is connected to the pressure chamber B of cylinder 1 which causes piston 2 to be forced in a downward direction. Since pressure has been released in cylinder 4 there is no force to restrain this movement and the downward movement of piston 2 causes the cam rack to move to the right. The movement of the cam rack to the right, as stated previously, causes piston 4 to rise, thus uncovering port 30 to the high pressure chamber B in the lower portion of cylinder 4. This causes pressure to be maintained on actuating chamber 31 of piston 1 which now in addition to piston 2 has pressure and causes a downward force to be exerted on piston 1 which in turn adds to the perpendicular force on the linear cam 18. At the same time piston 2 continuing to move in a downward position causes its spool valve to move downward uncovering the port 26 to release pressure from the actuating chamber 27 of piston 3 thus connecting it to the reservoir via chamber A of cylinder 2. This allows piston 3 to be moved in the upward direction with minimum resistance. This self-commutating action is the same as for the Forward mode and will continue as in the previous case. Thus piston 2 will cut off as it reaches bottom dead center and piston 4 will in turn be activated and subsequently the sequence of piston 3, piston 2, piston 1, etc. will continue until the Reverse solenoid is deactivated returning line 15 to the pressurized condition whereby the upper chambers of all four chambers will, in effect, be pressurized to lock the motor against any further rectilinear motion. It will be seen that the actuation of the four drive pistons rotates in opposite directions in accordance with whether the Forward or the Reverse directional control valve is actuated. As with the previously described condition, the self-commutating action of the system causes the motor to continue in the Reverse direction to the right until some external signal causes the Reverse solenoid to be deactivated.

It should be noted in passing that in conventional control systems for such linear positioning systems, especially when utilized in the field of manipulators or robotics, a computer control will specify motion in one direction and will usually give a count number of some sort which, in effect, specifies the amount of linear displacement desired. A physical counter may be conventionally mounted on the stationary member and by means of some mechanical follower can either be set to count the cam lobes of the main cam rack 18 or of the aligner rack 20, if finer control is desired. When the specified count is reached, the system will automatically de-energize the particular directional solenoid valve. In the simplest case this can be accomplished by a simple micro-switch having a follower which would engage either the main cam rack 18 or said alignment rack 20. As will be readily apparent to those skilled in the art, the counter mechanism for monitoring the position of the arm would in all probability be initially set to 0 for a particular arm location. The current count stored would indicate the current position of the arm and any control information would indicate that the stored count number would have to be either incremented or decremented. Such a system, as will be apparent, provides relative position information to the computer system and thus offer considerably greater control flexibility.

Figure 2:
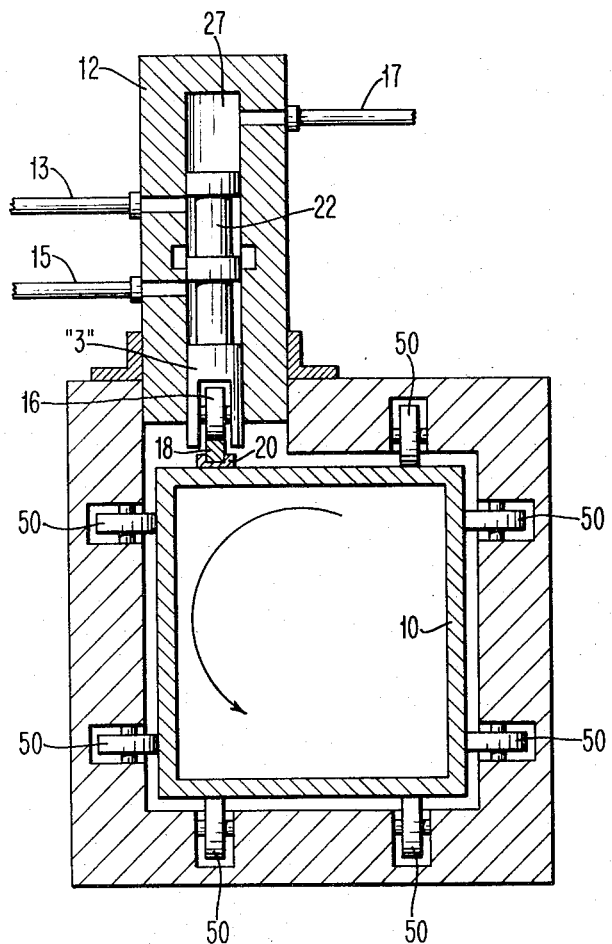
FIG. 2 comprises a cross-sectional view of the linear hydraulic motor of FIG. 1 taken along the section lines 2—2 in FIG. 1.

Referring now to FIG. 2, the configuration of the present system wherein the pressurized condition of all four motor pistons when the motor is in the non-moving or locked position is shown. How this sets up a torsional or rotational component in the linear arm 10 with respect to the seven support bearings 50 is apparent when it is realized that the considerable pressure applied at the surface of the cam rack by the four pistons exerts a rotational or torsional force on the linear arm. This rotational force causes all four corners of the rectangular shaped arm 10 to come into extremely forceful contact with the bearings 50. If the cam rack 18 were located in the middle of the arm 10, this pressure would lock the arm against upward and downward motion but would leave it relatively free to move laterally. The eccentric mounting of the cam thus causes the arm to be locked in both the vertical and horizontal direction. Thus, any slight play between the linear arm 10 and the bearings 50 is taken up by the very slight angular rotation of the arm due to the torsional effect of completely pressurizing the motor. This slight angular rotation has been found to affect the horizontal and vertical positioning of the arm negligibly insofar as accurate overall positioning is concerned. It may further be seen that as slight wear occurs between bearing surfaces located on the arm and the surface of the bearings themselves, this wear is automatically compensated for by the rotational effect of locking the motor.

The ability to relax the tolerances in such a hydraulic system and especially in an elongated arm where it would be extremely difficult and expensive to obtain precisely machined surfaces and provide for bearing adjustments, results in very substantial savings in manufacturing costs. The combination of the motor design that allows full pressure to be applied to all pistons bringing maximum pressurization of the arm combined with the eccentric mounting of the main motor body and drive pistons is believed to be quite novel in the art and this combination of features makes the present invention very suitable for the large-scale production of precise manipulative or robot systems.

An additional feature or mode of operation possible with the present system is that of free-wheeling. What this means is the capability of allowing some external force to be applied to the motor wherein the motor can be freely moved by the external force without causing any damage or other problems to the motor. By suitably energizing both of the directional solenoids and thus the two associated valves both the upper and lower pressure chambers A and B associated with the four drive motor spool valves are connected to reservoir or the low pressure line. Thus, there is literally no resistance to movement of the linear arm by some external force. When it is desired to repressurize the system at some new location, the two directional control valves are merely de-energized, thus returning full pressure to said A and B chambers. This feature is of considerable use when the system is to be utilized to perform operations on, for example, an assembly line where at some point one of the directions of movement is physically locked onto the assembly line belt as some other function is performed. At this time the hydraulic motor which located its arm at some predetermined point on the assembly belt must either be synchronized to the exact assembly line speed to maintain a desired relative position or more simply can be physically picked up by some sort of a moving member or clamp on the assembly line. If the latter feature is provided with the present system, the Forward and Reverse directional valves would be energized and the arm could be constrained to move in the necessary direction without causing any other difficulties. It will, of course, be readily understood that the align piston 32 would have to be disengaged from its track 20 in order for the movement to take place.

Referring briefly to FIG. 3, this drawing shows a set of three curves which essentially describe a typical cycle of operation of the four control valves, it being understood that the bottom curve represents either of the two directional valves and they would not normally both be energized when operation of the motor is required. At time 0, it is assumed that a signal is applied to the system indicating a desired movement of the motor and assumed further that a sufficient displacement is required for the high speed solenoid to be actuated. The upper curve shows that for some predetermined period of time the high speed valve is actuated with the attendant decrease in flow resistance in the return line from the motor which, will has been explained allows high speed operation of the motor to occur. As stated previously, at some predetermined time which would normally be automatically programmed into the control system, the high speed valve is simply turned off at which point the motor will automatically return to low speed operation with no other controls required. Looking at the two lower curves, these are noted to be substantially identical and describe the physical movement of the alignment valve and the two directional valves Forward and Reverse. As will be appreciated, before movement of the motor can occur, the alignment piston must be released. The curve of FIG. 3 shows the alignment control valve being first energized and then de-energized in substantial synchronization with the directional control valves. This mode of operation has been found to be satisfactory, it being readily understood that a person skilled in the art could time this system to energize the alignment solenoid slightly before energization of the directional solenoid and similarly to de-energize the solenoid slightly after de-energization of the directional solenoids if this were found preferable.

Figure 4:
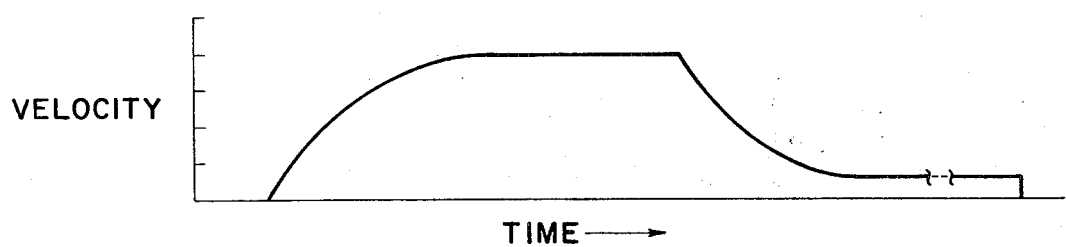
FIG. 4 is a velocity vs. time curve for the linear arm carrying the linear cam rack assuming that the main actuating body is fixed.

Referring now briefly to FIG. 4, a velocity curve for the movement of the arm is shown. The left-hand portion illustrates high speed operation and the right-hand portion, as the high-low speed solenoid is de-energized, illustrates low speed operation. It will be noted from this curve that utilizing the parabolic camming rack allows the velocity of the arm to be quite smooth although as the system comes up to speed and inertial effects are overcome, the velocity does gradually increase. The slow down to low speed operation will also be noted to be relatively smooth as the motor decelerates upon de-energization of the high speed solenoid.

The preceding description of FIGS. 3 and 4 completes the description of the specifically disclosed embodiment of the invention. It will, of course, be apparent that certain modifications and changes could readily be made in the disclosed linear hydraulic motor by those skilled in the art without substantially departing from the spirit and the scope of the invention.

For example, although four symmetrically located drive pistons are specifically disclosed and illustrated, it is, of course, possible to utilize additional pistons assumedly for the purpose of providing more driving force. The requirements for symmetrically locating any additional pistons with respect to the camming rack have been set forth previously, however, it is believed that it would be far more practical to simply enlarge the size of the pistons, change the amplitude of the camming rack to obtain more driving force or increase the pressure of the hydraulic supply system to increase the power of the motor rather than by modifying the system to add groups of additional pistons.

Similarly, although a parabolic cam rack has been disclosed, other cyclic cam shapes would be possible such, for example, as a sine rack or other shapes. Such shapes would normally be dictated by the requirements of the ultimate use of the system. Also, such factors as the dynamic characteristics of the object being ultimately moved by the system, the flow characteristics of the hydraulic system, etc. would have to be considered.

While the positioning of the pistons on essentially separate cycles of the cam rack is illustrated, it would be possible to separate them further if larger pistons and power were desired, or to even compact them further providing that the previously enumerated restrictions of 90° displacement of the four cams be observed.

Also, all the control valves have been illustrated as being electrically operated by solenoid motors. These could obviously be moved by other means such as pneumatic or hydraulic actuators, some directly actuatable sensing device, etc. Similarly, the control valve block could be directly incorporated in the main motor body, if desired, with appropriate provision being made for connecting the hydraulic pressure and return lines from the external hydraulic source.

What is claimed is:

1. A linear hydraulic motor comprising a cyclical linear cam drive rack,
    a motor block containing a plurality of hydraulically actuated pistons, valve assemblies connected directly to and forming an extension of said valve assemblies being interconnected to sequentially operate said pistons for effecting relative movement between said motor block and said drive rack selectively in either direction, said pistons being adapted to engage said drive rack,
    means for mounting said drive rack eccentrically on a linear arm, said arm being fixedly journaled with respect to said motor block whereby the pressure of said pistons on said rack causes a torsional force to be applied to said linear arm rotationally locking same in said journaling means, journal means for constraining the relative motion of said motor block to a path parallel to said drive rack and means for controlling the flow of hydraulic fluid to said motor block to initiate movement of said motor.

2. A linear hydraulic motor as set forth in claim 1 including an additional linear rack fixedly connected to said linear arm adjacent and parallel to said cam drive rack, aligner piston means located in said motor block to selectively engage said aligner rack to precisely position said motor block with respect to said aligner rack when said aligner piston is hydraulically urged against same.

3. A linear hydraulic motor as set forth in claim 2 including a flow restriction in the return path of the hydraulic supply to said motor which may be selectively introduced in or removed from the hydraulic circuit during operation of the motor whereby the the motor operates at a reduced speed when said flow restriction is in the hydraulic circuit and at high speed when the flow restriction is effectively removed from said hydraulic circuit.

4. A linear hydraulic motor as set forth in claim 2 wherein said motor block and assembly comprise four drive pistons functionally displaced by 90° on one or more cycles of said cam rack, said cam rack being cyclical and symmetrical, and means for applying full hydraulic pressure to all four pistons to both linearly and rotationally lock said arm with respect to said motor block when the motor is not actuated for linear movement.

5. A linear hydraulic motor comprising a motor body member and a linear member mounted for linear movement with respect to said body member, at least four drive pistons located in said body member linearly displaced along said linear member, a cyclical linear cam drive rack mounted fixedly along said linear member, means including said body member for imparting relative motion to said linear member with respect to said body member when pressure is selectively applied to at least one of said pistons, said pistons being so disposed with respect to said linear cam drive rack that all linear forces along said linear drive rack are canceled out when pressure is applied to all of said pistons, valve means in said body member associated with each piston member and directly actuated thereby operable to actuate one of two other pistons depending upon a selected direction of travel of said linear member, each said valve means including first and second chambers selectively connectable to a hydraulic pressure source, control means operable to connect all of said first chambers to said hydraulic pressure source when it is desired to cause said motor to move in a first direction and for connecting all of said second chambers to said hydraulic pressure source when it is desired to cause said motor to move in the other direction, said control means being further operable for connecting both said first and second chambers to said pressure source when it is desired to lock the position of said motor.

6. A linear hydraulic motor as set forth in claim 5 wherein said valve means in said body member associated with each piston includes porting and passage means in said body member operable in conjunction with said valve means for selectively connecting the first or second chamber with the actuatin chamber of another piston displaced 90° along the linear cam rack from said valve means.

7. A linear hydraulic motor as set forth in claim 6, said cam rack being eccentrically mounted on said linear member with respect to its center of rotation and said linear member being so journaled with respect to said motor body that when at least one of said motor pistons is pressurized a strong torsional force locks the linear member in said journal bearings.

8. A linear motor as set forth in claim 7 wherein said control means includes further means to selectively release pressure in both said first and second chambers when it is desired to have the linear arm moved by a source external to said motor assembly.

9. A linear motor as set forth in claim 8 wherein said imparting means comprises a cyclical linear cam rack which engages with said pistons to produce a linear component of force along said linear member.

10. A linear hydraulic motor as set forth in claim 9 wherein said linear cam rack is shaped so that the pistons follow a parabolic displacement.

11. A linear hydraulic motor as set forth in claim 9 wherein each said piston and associated valve assembly defining said first and second chambers as well as the actuating chamber for said pistons comprise a single rigid member mounted in the cylinder provided for each piston in said motor body.

12. A linear hydraulic motor as set forth in claim 10 including an alignment rack mounted on said linear member adjacent to said linear cam rack and additional piston means mounted in said motor body adapted to be selectively engaged with said alignment rack whereby the precise alignment of said linear member with respect to said motor body is possible.

13. A linear hydraulic motor as set forth in claim 11 including a flow restriction means selectively connectable in the reservoir line of the hydraulic system supplying hydraulic pressure to said motor whereby when said flow restriction means is introduced during operation of said motor the motor operates at low speed and when said flow restriction is effectively removed the motor operates at high speed.

* * * * *